United States Patent [19]

Lamb et al.

[11] Patent Number: 4,983,295

[45] Date of Patent: Jan. 8, 1991

[54] SEPARATOR

[75] Inventors: Timothy J. Lamb; Robert P. M. Smisson, both of Clevedon, Great Britain

[73] Assignee: Hydro International Limited, United Kingdom

[21] Appl. No.: 418,150

[22] Filed: Oct. 6, 1989

[30] Foreign Application Priority Data

Oct. 7, 1988 [GB] United Kingdom ................. 8823632

[51] Int. Cl.$^5$ .......................................... B01P 17/025
[52] U.S. Cl. .................................... 210/521; 210/522; 210/522.1
[58] Field of Search ............... 210/579, 521, 522, 525, 210/532.1

[56] References Cited

U.S. PATENT DOCUMENTS 4,747,962 5/1988 Smisson ............................... 210/788

Primary Examiner—Charles Hart
Attorney, Agent, or Firm—Larson and Taylor

[57] ABSTRACT

There is disclosed a separator of the low energy type comprising a cylindrical vessel (1) in which rotational movement of liquid and suspended solids within the vessel (1) is sufficient to cause and enhance an inward sweeping effect towards an annular opening in the base (3) on solids accumulated at the base (3) of the vessel (1), while being of sufficiently low energy that separation of the solid components of the liquid in the vessel (1) is brought about primarily by gravity. In order to trap floatables material, a floatables trap (19) is provided inward of an annular dip plate (9) in the vessel (1).

10 Claims, 4 Drawing Sheets

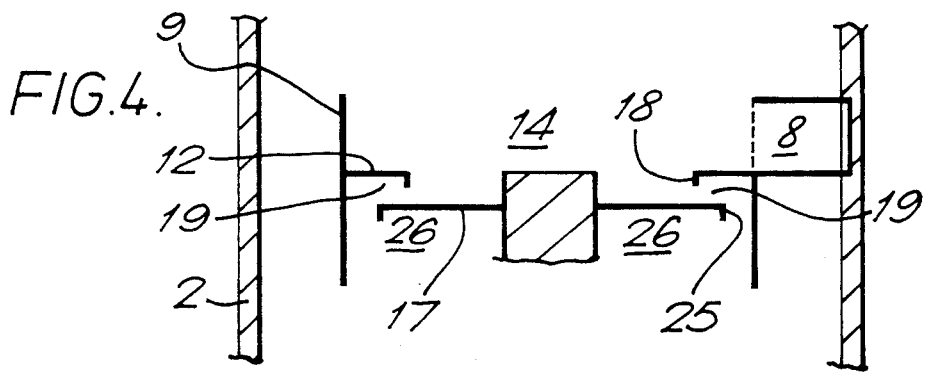
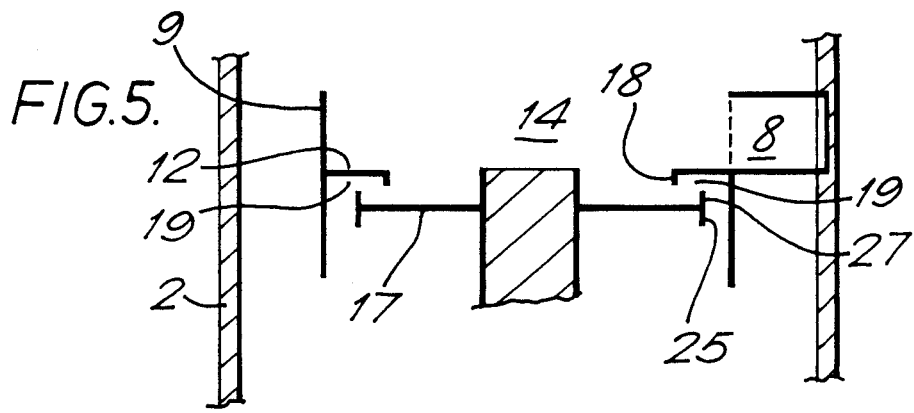
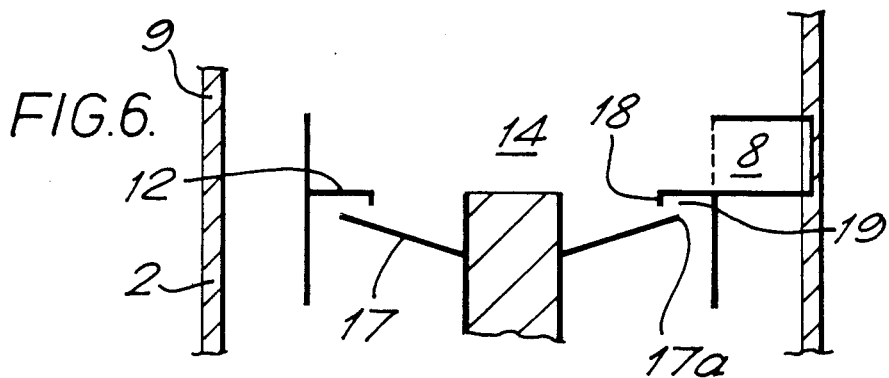

SEPARATOR

FIELD OF THE INVENTION

This invention relates to a separator capable of operating at low energy for separating solid components out of a liquid mixture and is more particularly, but not exclusively, concerned with improving the separator's ability to trap floatable materials thereby to avoid undue contamination of the clean liquid being removed from the separator.

BACKGROUND OF THE INVENTION

Our British Patent No. 2082941 discloses a separator which is particularly suitable for separating, for example, sewage and other solid matter from water in storm water overflows. The separator is in the form of a cylindrical vessel having an inlet which is disposed tangentially so as to promote a circulating flow within the vessel. This circulating flow comprises an outer, relatively fast, flow and an inner, relatively slow, flow. The shear zone between these two regions is stabilised by an annular dip plate which projects downwardly from the top of the vessel. A flow modifying member is provided in the vessel to enhance the removal of solid particles accumulating at the bottom of the vessel to a central outlet. Clean water is removed from the top of the vessel. In the vessel shown in our British Patent No. 2082941, a floatables trap is provided directly above the inlet and opposite the outlet in order to reduce the possibility of floatable solids being discharged through the clean water outlet. It is specifically stated that the trap should be disposed anywhere around the circumference of the vortex chamber.

It has been found that, under storm conditions, the floatables trap of the separator disclosed in our British Patent No. 2082941, whilst performing satisfactorily for the majority of the time, may permit floatable material to reach the outlet, by passing under the annular dip plate. It is believed that this may occur as the separator is filling during the onset of a storm or, in the alternative, in a lull during a storm when the level of the water in the separator may drop below the level of the dip plate. Departing from the teaching of British Patent No. 2082941, it is now proposed to provide a floatables trap at an upper region of the vessel, inward of the annular dip plate.

EP-A- No. 0168538 discloses a clarifier for removing particulate matter from a liquid comprising a chamber defined by a cylindrical wall. At the upper region of the chamber there is provided a cylindrical member, vertically orientated, which extends through a top plate. Outside this cylindrical member there is provided a floatables trap. The majority of floatable material will float upwards through the slot defined between the upper rim 22 of the large truncated cone 21 and the chamber wall and be trapped by the floatables trap defined by the annular plate 9 and the outer wall 2. Other floatable material may rise within the large truncated cone 21 but it is stated that the upwardly flowing liquid follows the inner surface of the larger truncated cone 21 and therefore has a radially outward component. It is also stated that any floatables inward of the large truncated cone will tend to rise into the annular space between the dip plate 9b and the chamber wall 2. Should any floatable material not be trapped by the annular trap between plate 9b and outer wall 2, it will exit with clarified liquid and pass over the weir 9a into the trough 11 and collect in the effluent collection box 13, thereby polluting the clarified liquid.

BRIEF DESCRIPTION OF THE INVENTION

According to the present invention, there is provided a low energy separator for separating solid components out of a liquid mixture, comprising (a) a vessel having a cylindrical outer wall and a base at one end, (b) a body which is provided within the vessel and which defines with the base an annular opening spaced from the outer wall, (c) an inlet for introducing the liquid mixture into the vessel, (d) an outlet in the upper region of the vessel for removing from the vessel liquid from which solid components have been separated, (e) a primary annular dip plate in an upper region of the vessel and spaced from the outer wall of the vessel and (f) means for promoting a rotational movement of liquid and suspended solids within the vessel, said rotational movement being sufficient to cause or enhance an inward sweeping effect towards the annular opening on solids accumulated at the base of the vessel, whilst being of sufficiently low energy that separation of the solids components of the liquid in the vessel is brought about primarily by gravity; wherein the separator also includes a floatables trap defined in the upper region of the vessel, inward of the primary dip plate, the floatables trap being defined by a wall or walls which terminate below the level of the outlet whereby any flow path from the floatables trap to the outlet must be first downward to clear the wall or walls of the trap and then upward to reach the outlet.

DETAILED DESCRIPTION

The floatables trap may be defined between (a) the inner surface of the primary annular dip plate (which provides the outer extremity or boundary of the trap), (b) an annular, generally horizontal plate extending inwardly from the dip plate (which defines an upper boundary of the trap) and (c) a short, secondary dip plate, inward of the primary dip plate and extending downwardly from the annular, generally horizontal plate (which defines an inner boundary of the floatables trap). The secondary, annular dip plate defines a cylindrical aperture communicating with the outlet.

Preferably, situated below the annular aperture, and axially of the vessel is a generally circular baffle which overlaps, in the vertical direction, the floatables trap in order to prevent floatable material floating directly upwards out of the annular aperture to the outlet bypassing the trap. The periphery of the circular baffle may also be provided with a short annular dip plate acting as a secondary floatables trap.

The length of the secondary dip plate depends upon the overall dimensions of the separator. Preferably, however, the distance between the lower extremity of the secondary dip plate and the upper surface of the baffle is relatively short so that the likelihood of any floatable material being able to by pass the first floatables trap is negligible. In order further to reduce the likelihood of floatables by passing the floatables trap, the baffle may be inclined such that it overlaps the secondary dip plate in the horizontal direction.

The means for promoting a rotational movement of liquid and suspended solids within the vessel may be the inlet to the vessel by which the liquid mixture is introduced into the vessel. In such a case, the inlet is preferably tangential and the energy of the liquid mixture being introduced into the vessel is sufficient to initiate and sustain the rotational movement in the vessel. Alternatively, or in addition, a further inlet may be provided by which an energizing liquid is introduced into the vessel to promote swirl (see our British Patent No. 2158741).

DESCRIPTION OF THE DRAWINGS

For a better understanding of the present invention and so show how the same may be carried into effect, reference will now be made, by way of example, to the accompanying drawings in which:

FIGS. 4 to 6 show alternative arrangements of the upper region of the separator shown in FIG. 3.

Figure 1:
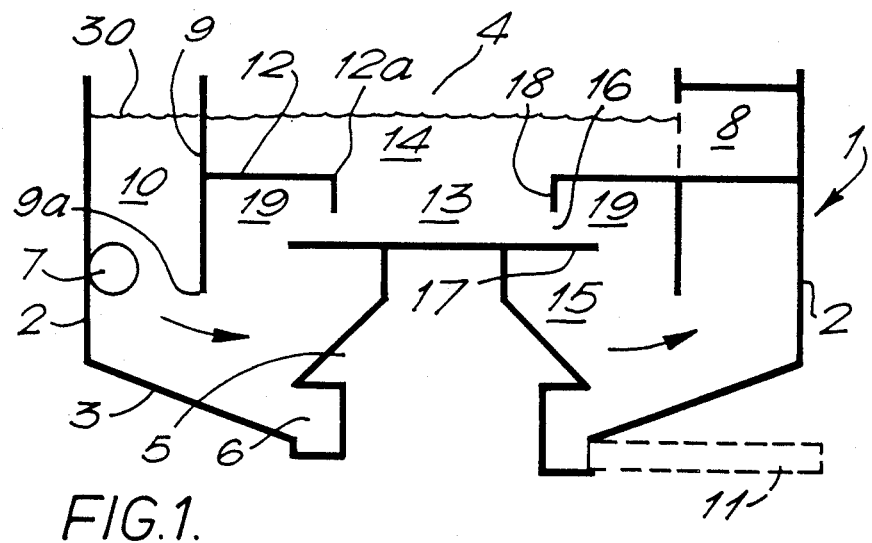
FIG. 1 is a diagrammatic, vertical section through a separator in accordance with the present invention.
Figure 2:
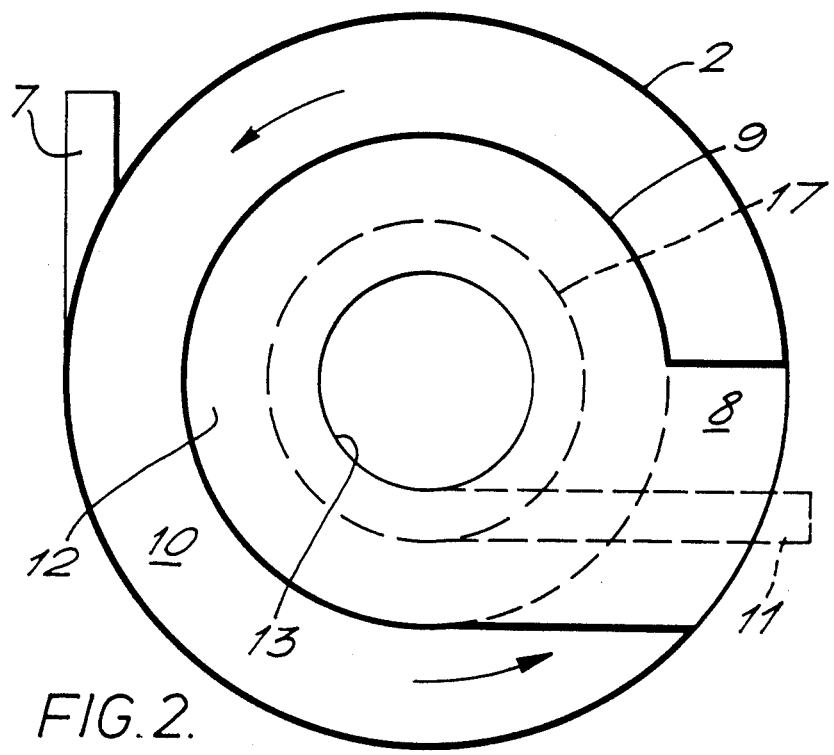
FIG. 2 is a plan view of the separator shown in FIG. 1.

The separator depicted in FIGS. 1 and 2 comprises a vessel having a cylindrical outer wall 2 and a sloping, conical base 3. The other end 4 of the vessel 1, opposite the base 3, is open, although it is to be appreciated that the separator may be closed by a lid (see FIG. 3). Within the vessel 1 there is provided a flow modifying member 5 in the shape of a cone which defines with the base 3 an annular opening 6 which is spaced from the outer wall 2 of the vessel. A tangential inlet 7 to the vessel 1, through the outer wall 2, is provided by which a liquid containing solid components may be introduced into the vessel 1. There is also provided an outlet duct 8 and an annular dip plate 9 which is concentric with the outer wall 2 and spaced from the outer wall 2 defining an annular slot 10. The dip plate has an annular lower edge 9a. The dip plate 9 is supported by horizontal beams (not shown). Communicating with the annular opening 6 in the base 3 of the vessel 1 is an outlet pipe 11 by which solids accumulated at the base 3 may be removed.

Projecting inwardly from the dip plate 9 is a horizontal annular plate 12 having an inner edge 12a which defines a circular aperture 13 communicating with a chamber 14 in which clean water collects before spilling out of the outlet 8. The chamber 14 communicates with the interior of the vessel 15 via an annular gap 16 which is defined between the lower surface of the horizontal plate 12 and a circular baffle 17 which is supported on the top of the flow modifying member 5.

The inner circular edge 12a of the horizontal plate 12 is provided with a downturned lip, or secondary dip plate 18 which extends across approximately half the height of the annular gap 16. This secondary dip plate 18, the horizontal plate 12 and the inner surface of the baffle 9 define a floatables trap 19.

In FIGS. 3 to 7, like parts are numbered with like reference numerals. However, in the embodiments shown in FIGS. 3 to 7, the floatables trap is somewhat modified. Thus, in FIG. 3, instead of floatables trap 19 as shown in FIG. 1, a very short secondary dip plate 25 is provided extending downwardly from the outer peripheral edge of the baffle 17. The floatables trap 26 defined between this secondary dip plate 25, the baffle 17 and a cylindrical vertical member projecting from the flow modify member 5 is very short.

Figure 3:
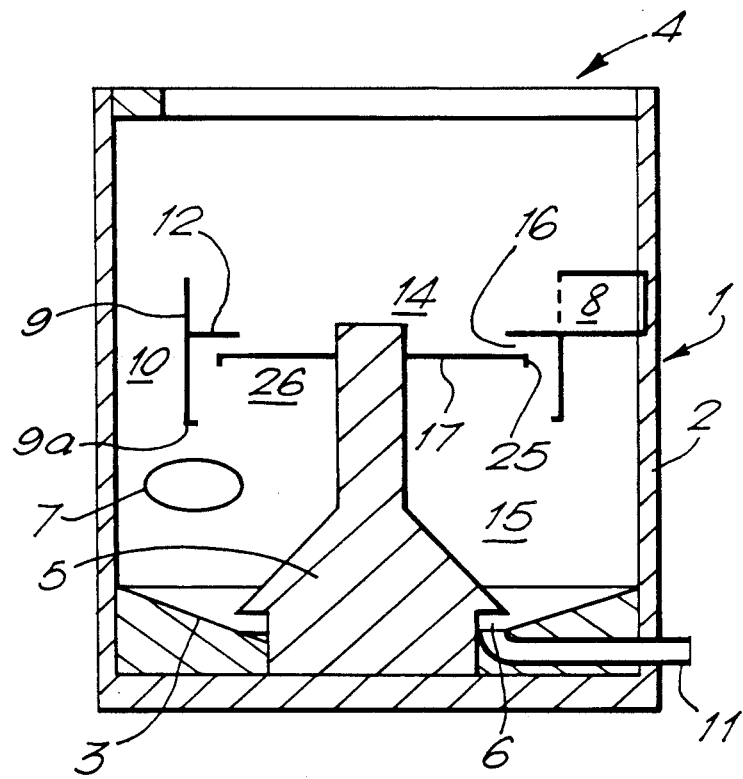
FIG. 3 is a vertical section through another embodiment of a separator in accordance with the present invention.

In FIG. 4, a combination of the arrangements shown in each of FIGS. 1 and 3 is provided in which two separate floatable traps 19 and 26 exist. The embodiment shown in FIG. 5 is a slight variation of that shown in FIG. 4 except that the secondary dip plate 25 provided on the peripheral edge of the plate 17 projects upwardly above the plane of the baffle 17 to form an upwardly projecting lip 27 which surrounds the baffle 17.

Figure 7:
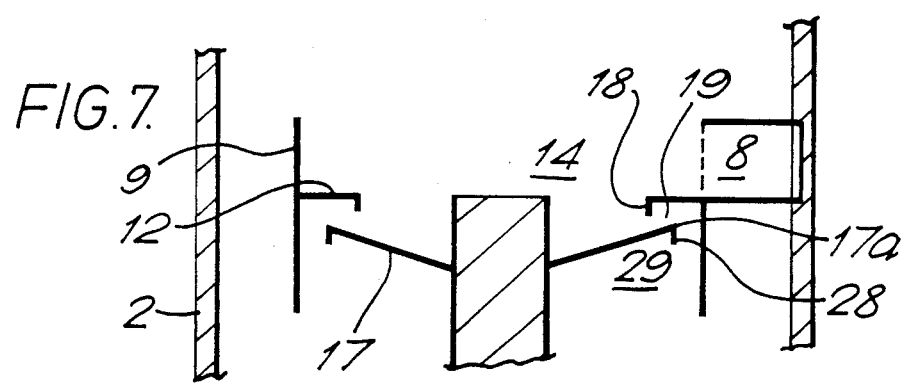

In FIGS. 6 and 7, the baffle 17 is generally conical. Thus, in FIG. 6, the upper peripheral edge 17a of the baffle 17 overlaps, or nearly overlaps, in the horizontal direction, the secondary dip plate 18 projecting from the plate 12. In the embodiment shown in FIG. 7, the upper peripheral edge 17a of the baffle 17 includes a downward peripheral dip plate 28 defining a floatables trap 29.

The principle underlining all of the embodiments shown in the figures is one of creating a floatables trap inward of the dip plate 9.

The operation of the separator according to the present invention will now be described, with particular reference to FIGS. 1 and 2.

Under normal operating conditions, collected water, for instance rain water from road run-off, enters the vessel 1 through the inlet 7. Normally, the rate at which liquid enters the vessel will be relatively slow and the separator will act almost as a clarifying vessel in which material heavier than the water entering sinks to the base 3 of the vessel 1, whilst clean water will slowly spill into the outlet duct 7 and will be carried away. The liquid in the vessel 1 will be circulating only very slowly, if at all.

Under storm conditions, however, in which large amounts of sediment and other such solid matter is carried into the water run-off, liquid entering the vessel 6 through the tangential inlet 7 will be travelling at a much higher velocity because of the high pressure head from liquid backed-up in the drainage system. Under these conditions, the vessel 1 will quickly fill and the liquid mixture being tangentially introduced in the vessel via the inlet 7 will circulate in the direction shown by the arrows in the vessel (FIG. 1 and FIG. 2). As described in our British Patent Specification No. 2082941, this circulating flow within the vessel is sufficient to cause an inward sweeping effect toward the annular opening 6 in the base 3 on solids accumulating at the base 3 of the vessel. However, the energy of the circulating fluid is not so large that centrifugal forces have any substantial effect on the particles of solid matter rotating in the vessel 1. The accumulated matter at the base may be removed via the outlet pipe 11. The flow modifying member 5 assists in creating a secondary, generally toroidal flow in the vessel whilst the annular dip plate 9 stabilizes a shear zone between an outer, relatively fast, flow and an inner, relatively slow, flow of liquid in the vessel 1.

Under storm conditions, the upper level of liquid in the vessel 1 will be close to the top of the annular dip plate 9, probably around the level shown in FIG. 1 by the line 30.

Under normal storm conditions, the separator will be full and it is unlikely that any floatable material will escape into the main central part 15 of the vessel, but will rise and be trapped, floating, at the top of the annular slot 10. However, it is possible that even when the vessel 1 is full some floatable material may escape into the central region 15. Moreover, as the vessel is filling and the level of liquid is below the level of the bottom edge 9a of the dip plate, or if the level of the water drops below the lower edge 9a of the dip plate 9 during a lull in a storm, it is likely that some of the floatable material may enter the central region 15 of the vessel, inward of the dip plate. According to the invention, a floatables trap 19 is provided inward of the dip plate to trap any floatable material which escapes into the central region 15 of the vessel. Thus, in FIG. 1, the floatables trap 19 will tend to trap the majority of floating material as the level of water rises in the vessel. Although it is possible that some floatable material will still escape, by passing below the lower edge of the secondary dip plate 18, the amount which will so escape is greatly reduced. It is to be noted that the secondary dip-plate 18 does not interfere with the secondary, toroidal flow in the vessel. Moreover, any downward projection on the baffle 17 should be small (see FIG. 4) so that no undue effect on the toroidal flow is caused.

The various embodiments in FIGS. 3, 4 and 5 represent modifications of the arrangement shown in FIG. 1 and work on similar principles. It is to be noted that, in FIG. 5, the upward-turned peripheral lip 27 on the baffle 17 prevents any floatable material escaping into the central outlet region 14 since the level of water in the vessel must rise to a level at, or above, the lower edge of the secondary dip plate 18, before any liquid can spill over the top of the lip 27 and into the upper central region 14. The embodiments shown in FIGS. 6 and 7 work on a similar principle except that the upturned lip 27 is replaced by the baffle plate being inclined, the upper edge 17a of the baffle, overlaping in an horizontal direction with the secondary dip plate 18.

Figure 8:
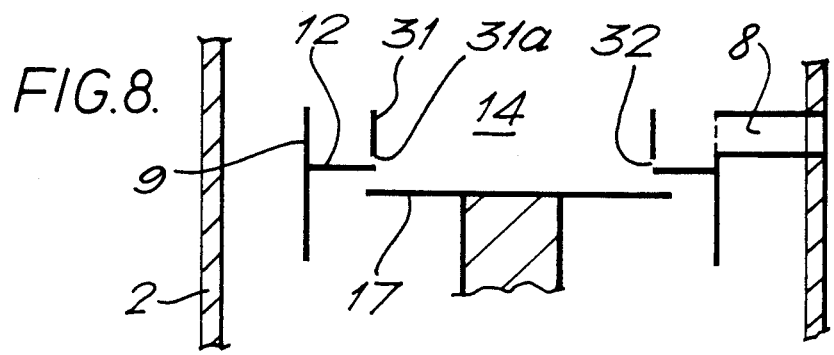

In the embodiment shown in FIG. 8, the floatables trap is defined in the upper central region 14 of the vessel 2 inward of an annular secondary dip plate 31 which is supported by the beams (not shown) which also support the primary dip plate 9. The lower edge 31a of the secondary dip plate 31 is spaced from the plate 12 to define a narrow annular gap 32 through which clean water may flow to the outlet 8. However, floatables material will tend to "bob" up to the surface of the liquid in the vessel 1 inward of the secondary dip plate 31. The level of liquid in the vessel is, under storm conditions below the top of the level of the primary and secondary dip plates 9, 31 but above the level of the gap 32.

It will be noted that, in all the accompanying drawings, the floatables trap is defined by a wall or walls which terminate below the level of the outlet so that any flow path from the floatables trap to the outlet must first be downward to clear the wall or walls and then upward to reach the outlet.

The separator of the present invention may be a separator in accordance with our British Patent No. 2158741 in which there is provided a further inlet by which an energising fluid may be introduced into the vessel in a manner to cause or enhance rotational movement of the liquid in the vessel.

The vessel shown in FIG. 1 has a base region which is in accordance with our British Patent Publication No. 2189413. However, the base region of the separator may be as shown in the drawings of our British Patent Publication No. 2082941. The teachings of both of British Patent Publications Nos. 2082941 and 2189413 are incorporated herein by reference.

We claim:

1. A low energy separator for separating solid components out of a liquid mixture, comprising (a) a vessel having a cylindrical outer wall and a base at one end, (b) a body which is provided within the vessel and which defines with the base an annular opening spaced from the outer wall, (c) an inlet for introducing the liquid mixture into the vessel, (d) an outlet in the upper region of the vessel for removing from the vessel liquid from which solid components have been separated, (e) a primary annular dip plate in an upper region of the vessel and spaced from the outer wall of the vessel and (f) means for promoting a rotational movement of liquid and suspended solids within the vessel, said rotational movement being sufficient to cause or enhance an inward sweeping effect towards the annular opening on solids accumulated at the base of the vessel, whilst being of sufficiently low energy that separation of the solids components of the liquid in the vessel is brought about primarily by gravity; wherein the separator also includes a floatables trap defined in the upper region of the vessel, inward of the primary dip plate, the floatables trap being defined by a wall or walls which terminate below the level of the outlet whereby any flow path from the floatables trap to the outlet must first be downward to clear the wall or walls of the trap and then upward to reach the outlet.

2. A low energy separator according to claim 1, wherein the floatables trap is defined between (a) the inner surface of the primary annular dip plate (which provides the outer extremity or boundary of the trap), (b) an annular, generally horizontal plate extending inwardly from the dip plate (which defines an upper boundary of the trap) and (c) a short, secondary dip plate, inward of the primary dip plate and extending downwardly from the annular, generally horizontal plate (which secondary dip plate defines an inner boundary of the floatables trap), said secondary, annular dip plate defining a cylindrical aperture communicating with the outlet.

3. A low energy separator according to claim 2, wherein a generally circular baffle is orientated axially of the vessel below the level of the annular horizontal plate (b), said generally circular baffle overlapping, in the vertical direction, the floatables trap thereby to prevent floatable material from floating directly upwards, through the cylindrical aperture defined by the secondary annular dip plate, to the outlet thereby by passing the trap.

4. A low energy separator according to claim 3, wherein the periphery of the circular baffle is provided with a short, downwardly extending, annular dip plate which defines a secondary floatables trap.

5. A low energy separator according to claim 2, wherein, the distance between the lower extremity of the secondary dip plate and the upper surface of the circular baffle is relatively short compared to the distance between the annular horizontal plate (b) and the baffle so that the likelihood of any floatables material being able to by pass the first floatables trap is negligible.

6. A low energy separator according to claim 3, wherein the baffle is inclined such that it overlaps the secondary dip plate in the horizontal direction.

7. A low energy separator according to claim 1, wherein the means for promoting a rotational movement of liquid and suspended solids within the vessel is the inlet to the vessel by which the liquid mixture is introduced into the vessel.

8. A low energy separator according to claim 1, wherein the vessel is provided with an annular, generally horizontal plate extending inwardly from the dip plate and dividing the vessel into the upper region from which liquid is removed from the vessel and a lower region, the upper region of the vessel also being provided with an annular secondary dip plate, which is oriented generally axially of the vessel, and which has a lower edge which is spaced from the annular horizontal plate to define a narrow annular gap through which clean water may flow to the outlet.

9. A low energy separator according to claim 8, wherein the means for promoting a rotational movement of liquid and suspended solids within the vessel is the inlet to the vessel by which the liquid mixture is introduced into the vessel.

10. A low energy separator according to claim 9, wherein the inlet is tangential to the vessel to initiate and sustain rotational movement of the liquid in the vessel.

* * * * *